United States Patent
Ashkenazi et al.

(10) Patent No.: US 8,638,883 B2
(45) Date of Patent: Jan. 28, 2014

(54) DC OFFSET CANCELLATION IN DIRECT CONVERSION RECEIVERS

(75) Inventors: Rony Ashkenazi, Moshav Kidron (IL); Alexander Zaslavsky, Petach Tikva (IL); Gregory Uehara, Austin, TX (US); Brian Brunn, Bee Cave, TX (US)

(73) Assignee: Marvell World Trade Ltd., St. Michael (BB)

( * ) Notice: Subject to any disclaimer, the term of this patent is extended or adjusted under 35 U.S.C. 154(b) by 95 days.

(21) Appl. No.: 13/018,449

(22) Filed: Feb. 1, 2011

(65) Prior Publication Data

US 2011/0188612 A1 Aug. 4, 2011

Related U.S. Application Data

(60) Provisional application No. 61/301,120, filed on Feb. 3, 2010.

(51) Int. Cl.
*H04L 25/06* (2006.01)

(52) U.S. Cl.
USPC ........... 375/319; 375/345; 375/346; 375/350; 455/296; 455/324; 455/234.2

(58) Field of Classification Search
USPC ................... 375/319; 370/343, 379; 327/309; 330/306; 455/296, 234.2
See application file for complete search history.

(56) References Cited

U.S. PATENT DOCUMENTS

| | | | | |
|---|---|---|---|---|
| 3,819,864 | A * | 6/1974 | Carroll et al. | 370/532 |
| 4,495,470 | A * | 1/1985 | Bristol | 330/9 |
| 6,868,128 | B1 * | 3/2005 | Lane | 375/319 |
| 6,985,711 | B2 * | 1/2006 | Holenstein et al. | 455/312 |
| 8,126,094 | B2 * | 2/2012 | Komaili et al. | 375/345 |
| 2003/0109241 | A1 * | 6/2003 | Kim | 455/324 |
| 2005/0258989 | A1 * | 11/2005 | Li et al. | 341/120 |
| 2007/0190957 | A1 * | 8/2007 | Filipovic | 455/234.2 |
| 2007/0293180 | A1 * | 12/2007 | Rahman et al. | 455/296 |
| 2008/0123614 | A1 * | 5/2008 | Iida | 370/343 |
| 2008/0253431 | A1 * | 10/2008 | Ohba | 375/136 |

FOREIGN PATENT DOCUMENTS

JP 2003198405 A * 7/2003 ............... H04B 1/30

* cited by examiner

*Primary Examiner* — Daniel Washburn
*Assistant Examiner* — Amneet Singh

(57) ABSTRACT

A method includes receiving a signal using a direct conversion receiver, while the receiver is set at a gain that is selected from a range of possible gain values. Multiple DC offset correction values are provided for use by a DC offset cancellation loop, each DC offset correction value being associated with a respective sub-range of the range of the possible gain values. A DC offset correction value is selected from among the multiple DC offset correction values based on the gain to which the receiver is set. A DC offset in the signal is canceled by setting the DC offset cancellation loop to the selected DC offset correction value.

20 Claims, 2 Drawing Sheets

DC OFFSET CANCELLATION IN DIRECT CONVERSION RECEIVERS

CROSS-REFERENCE TO RELATED APPLICATIONS

This application claims the benefit of U.S. Provisional Patent Application 61/301,120, filed Feb. 3, 2010, whose disclosure is incorporated herein by reference in its entirety.

FIELD OF THE DISCLOSURE

The present disclosure relates generally to communication systems, and particularly to methods and systems for Direct Current (DC) offset cancellation in communication receivers.

BACKGROUND

Direct-conversion receivers are used in various communication systems, such as, for example, in mobile communication terminals. A direct-conversion receiver down-converts an input Radio Frequency (RF) signal to baseband or other low frequency by performing a single frequency conversion operation. Signals produced by direct-conversion receivers are sometimes distorted by DC offset.

The description above is presented as a general overview of related art in this field and should not be construed as an admission that any of the information it contains constitutes prior art against the present patent application.

SUMMARY

An embodiment that is described herein provides a method including receiving a signal using a direct conversion receiver, while the receiver is set at a gain that is selected from a range of possible gain values. Multiple DC offset correction values are provided for use by a DC offset cancellation loop, each DC offset correction value being associated with a respective sub-range of the range of the possible gain values. A DC offset correction value is selected from among the multiple DC offset correction values based on the gain to which the receiver is set. A DC offset in the signal is canceled by setting the DC offset cancellation loop to the selected DC offset correction value.

In some embodiments, selecting the DC offset correction value includes identifying the sub-range in which the gain of the receiver falls, and choosing the DC offset correction value that is associated with the identified sub-range. In an embodiment, canceling the DC offset includes updating the DC offset correction value while operating in the identified sub-range. In another embodiment, selecting the DC offset correction value includes retrieving the selected DC offset correction value from a memory, and updating the DC offset correction value includes storing the updated DC offset correction value in the memory. In some embodiments, the method includes initiating cancellation of the DC offset in the identified sub-range using the selected DC offset correction value.

In an embodiment, canceling the DC offset includes initiating cancellation of the DC offset with an initial loop bandwidth that is larger than a nominal loop bandwidth, in response to identifying that the gain of the receiver falls in the identified sub-range for the first time. Additionally or alternatively, canceling the DC offset includes initiating cancellation of the DC offset with an initial loop bandwidth that is larger than a nominal loop bandwidth, in response to identifying that a time that elapsed since the gain of the receiver previously fell in the identified sub-range exceeds a predefined time threshold. Further additionally or alternatively, canceling the DC offset includes initiating cancellation of the DC offset with an initial loop bandwidth that is larger than a nominal loop bandwidth, in response to identifying that a temperature change relative to a previous operation in the identified sub-range exceeds a predefined temperature threshold.

In a disclosed embodiment, providing the multiple DC offset correction values includes defining each of the DC offset correction values for a respective single setting of the gain. In another embodiment, canceling the DC offset includes initializing a DC offset cancellation loop with the selected DC offset correction value, and correcting the DC offset using the initialized DC offset cancellation loop. In yet another embodiment, canceling the DC offset includes setting a capacitor in a High-Pass Filter (HPF) with an electrical charge corresponding to the selected DC offset correction value, and filtering the signal with the HPF. In an embodiment, the HPF includes multiple selectable capacitors holding electrical charge levels corresponding to the multiple DC offset correction values, and canceling the DC offset includes selecting the capacitor corresponding to the selected DC offset correction value.

There is additionally provided, in accordance with an embodiment that is described herein, apparatus including a direct conversion receiver and baseband circuitry. The direct conversion receiver is configured to receive a signal while operating at a gain that is selected from a range of possible gain values. The baseband circuitry includes DC offset cancellation circuitry and is configured to hold multiple DC offset correction values that are each associated with a respective sub-range of the range of the possible gain values, to select a DC offset correction value from among the multiple DC offset correction values based on the gain to which the receiver is set, and to cancel a DC offset in the signal using the selected DC offset correction value.

In some embodiments, a mobile communication terminal includes the disclosed apparatus. In some embodiments, a chipset for processing signals in a mobile communication terminal includes the disclosed apparatus.

The present disclosure will be more fully understood from the following detailed description of the embodiments thereof, taken together with the drawings in which:

DETAILED DESCRIPTION OF EMBODIMENTS

Figure 1:
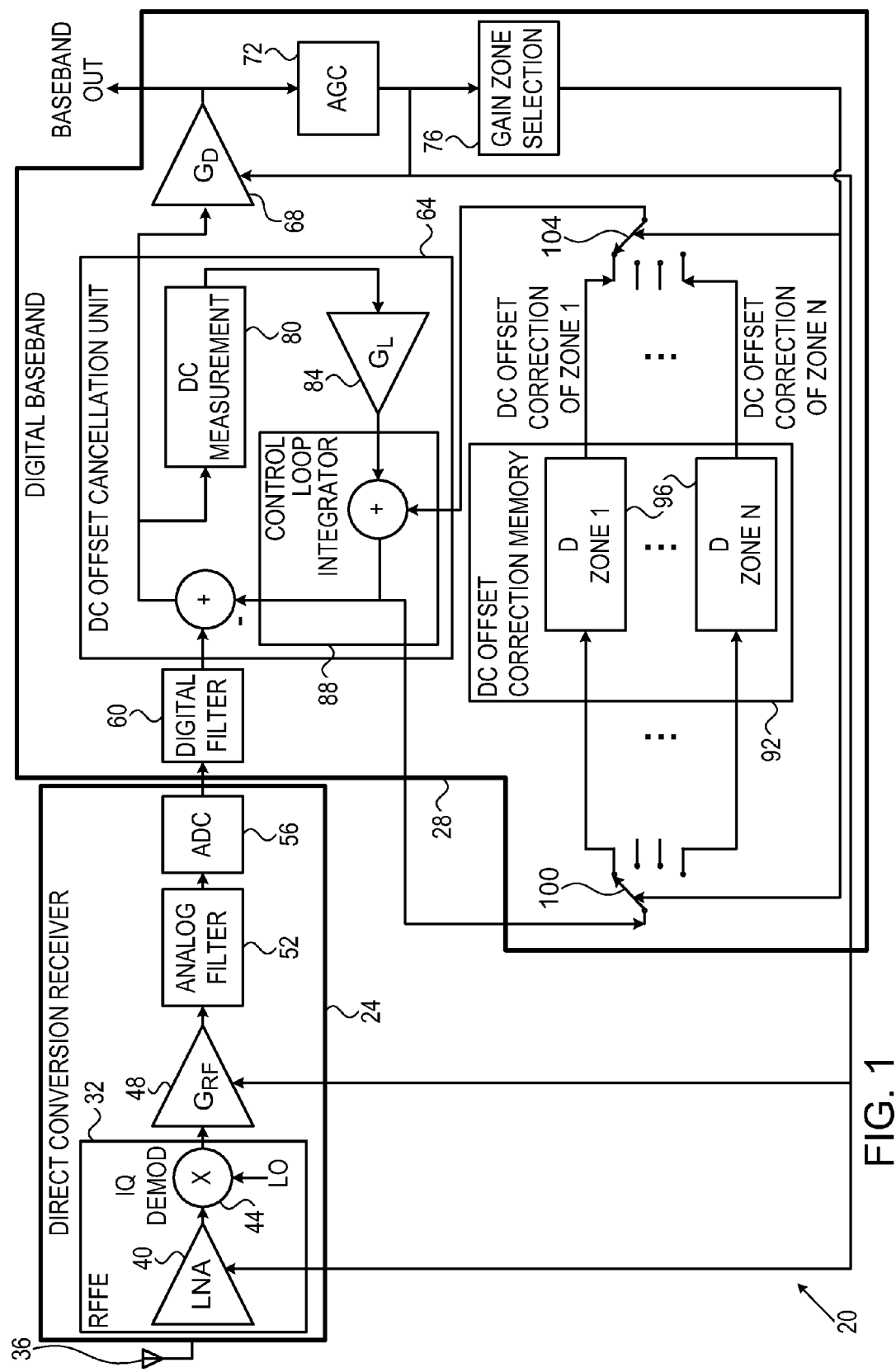
FIG. 1 is a block diagram that schematically illustrates elements of a receiver in a mobile communication terminal, in accordance with an embodiment that is described herein.

When a direct-conversion receiver processes an input RF signal, the output baseband signal may be distorted by DC offset. The offset may be the result, for example, of Local Oscillator (LO) self-mixing or DC offsets in baseband amplifiers, or it may stem from other reasons. In some cases, the DC offset is strong in comparison with the received signal, and may cause considerable degradation in reception quality.

Moreover, some receivers use Automatic Gain Control (AGC) that sets the receiver to a certain gain that is selected from a range of possible gain values. When using AGC, the DC offset in the baseband output signal may vary considerably with receiver gain. DC offset of this sort may be difficult to correct.

Embodiments that are described herein provide improved methods and systems for canceling DC offset in signals that are received using direct-conversion receivers. In some embodiments, the baseband signal produced by a direct-conversion receiver is provided to baseband circuitry that is configured to correct the DC offset with high speed and high accuracy over a wide dynamic range.

In an embodiment, the baseband circuitry operates a DC offset correction loop, e.g., a digital integrator, which corrects the DC offset by applying a certain DC offset correction value to the received signal. The correction value is typically dependent on the gain of the receiver. In order to correct the DC offset over a wide dynamic range, the range of possible gain values is divided into multiple sub-ranges, which are referred to as gain zones. In an embodiment, the sub-ranges are determined in such a way that DC offset is nearly gain-independent within each sub-range. The baseband circuitry holds multiple DC offset correction values corresponding to the multiple gain zones.

Whenever the receiver gain enters a certain gain zone, the baseband circuitry retrieves the DC offset correction value for this gain zone and initiates the DC offset cancellation loop using the retrieved DC offset correction value. The DC offset cancellation loop continues to cancel the DC offset while updating the DC offset correction value. In preparation for modifying the receiver gain and switching to another gain zone, the baseband circuitry stores the updated DC offset correction value of the current gain zone, fetches the DC offset correction value for the new gain zone, and then starts canceling the DC offset in the new gain zone using the newly-fetched DC offset correction value.

By switching DC offset correction values in this manner, the baseband circuitry effectively operates a separate and independent DC offset cancellation loop for each gain zone. Since the DC offset usually changes slowly within each sub-range, the DC offset cancellation loop can operate at a narrow loop bandwidth without compromising cancellation accuracy. As a result, in an embodiment, the DC offset cancellation loop causes little or no distortion in the baseband signal. Moreover, different gain zones often have different DC offset characteristics, e.g., different temperature dependence for example. Therefore, applying DC offset cancellation separately in each gain zone reduces transients (i.e., abrupt changes) in the DC offset when switching from one gain zone to another.

In some embodiments, the direct-conversion receiver implements the AGC by activating and deactivating discrete-gain amplification stages. Different constellations of amplification stages can be chosen to serve as gain zones.

In some embodiments, the baseband circuitry initially applies a wide loop bandwidth for a limited time period, e.g., when a certain gain zone is visited for the first time or after a long time period, and then narrows the bandwidth as described above.

FIG. 1 is a block diagram that schematically illustrates elements of a receiver in a mobile communication terminal 20, in accordance with an embodiment that is described herein. In an embodiment, terminal 20 operates in accordance with any suitable communication protocol or standard, such as Global System for Mobile communication (GSM), Universal Mobile Telecommunications System (UMTS), Long Term Evolution (LTE), LTE-Advanced (LTE-A) or WiMAX. Although the embodiments described herein refer to mobile communication terminals, the disclosed techniques can be used in various other receiver applications as well.

Terminal 20 comprises a direct-conversion receiver 24 and baseband circuitry 28. Receiver 24 comprises an RF Front End (RFFE) 32, which receives an input RF signal via an antenna 36. RFFE 32 amplifies the received RF signal using a Low-Noise Amplifier (LNA) 40, and then down-converts the RF signal to baseband using an In-phase/Quadrature (IQ) demodulator 44. The IQ demodulator mixes the RF signal with a suitable Local Oscillator (LO) signal. A baseband amplifier 48 having a gain $G_{RF}$ amplifies the down-converted signal, and the signal is then filtered using an analog filter 52. An Analog-To-Digital Converter (ADC) 56 digitizes the signal, so as to produce a digital baseband signal that is provided to baseband circuitry 28.

In various practical cases, the digital baseband signal produced by direct-conversion receiver 24 is distorted by DC offset that may degrade the receiver performance. DC offset may be caused, for example, by self-mixing of the LO signal to baseband, by DC offsets in baseband amplifier 48, or by any other source. In some embodiments, baseband circuitry 28 eliminates this performance degradation by correcting the DC offset in the baseband signal using techniques that are described in detail below.

In baseband circuitry 28, the incoming baseband signal is filtered by a digital filter 60, and then provided to a DC offset cancellation unit 64, which cancels the DC offset in the baseband signal. The internal structure and functions of unit 64 will be explained further below. The corrected baseband signal at the output of unit 64 is amplified by a digital gain unit 68 having a gain $G_D$, and then provided as output. In an embodiment, the output baseband signal is provided, for example, to a demodulator (not shown in the figures) that demodulates the signal and extracts data that is carried by the signal. Alternatively, in other embodiments, the output baseband signal is used for any other suitable purpose. The use of the output baseband signal, however, is considered to be outside the scope of the present disclosure.

In an embodiment, the RF signals at the input of receiver 24 vary over a wide dynamic range, e.g., a range of 80 dB or more. The baseband signal, however, should typically have a considerably smaller dynamic range, for example in order to be processed properly a subsequent demodulator. In some embodiments, baseband circuitry 28 comprises an Automatic Gain Control (AGC) unit 72 that automatically adjusts the gain of receiver 24 in order to reduce the dynamic range of the baseband signal. In the present example, the overall input dynamic range is divided into multiple sub-ranges that are referred to as gain zones. In an example embodiment, AGC unit 72 measures the signal amplitude at the output of digital gain unit 68, and controls the gain of LNA 40, baseband amplifier 48 and digital gain unit 68 based on the measured signal amplitude.

In the embodiment of FIG. 1, baseband circuitry 28 comprises a gain zone selection unit 76. AGC unit 72 indicates to gain zone selection unit 76 whether the currently-set gain zone is suitable for the currently-received signal, or whether a change of gain zone is needed for DC offset correction purposes. Gain zone selection unit 76 sets an appropriate DC offset correction for the currently-selected gain zone, as described below.

In some embodiments, each of LNA 40 and baseband amplifier 48 has a selectable discrete set of gain values. In an example embodiment, each of LNA 40 and baseband amplifier 48 comprises two or more amplification stages that can be activated and deactivated to achieve different gains. In these embodiments, AGC unit 72 sets the appropriate LNA and baseband amplifier gain values. Each constellation of these gain settings defines a respective gain zone in gain zone selection unit 76.

In an example embodiment, the input dynamic range is 80 dB, and it is divided into eight sub-ranges corresponding to different gain constellations of LNA 40 and baseband amplifier 48. For a given received signal, AGC unit 72 determines the sub-range to which the signal belongs, and configures LNA 40 and amplifier 48 to the corresponding gains. Gain zone selection unit 76 determines the DC offset correction gain zone that corresponds to the specific constellation of LNA 40 and amplifier 48. In the example embodiment seen in FIG. 1, each gain zone is actually represented by a single gain value. Alternatively, any other suitable scheme can be used.

Returning now to the description of DC offset cancellation unit 64. Unit 64 comprises a DC offset cancellation loop comprising a DC measurement module 80, a loop amplifier 84 having a loop gain $G_L$, and a control loop integrator 88. DC measurement module 80 measures the amplitude of the DC component in the baseband signal that is to be output by unit 64. Loop amplifier 84 amplifies the output of module 80 by the loop gain $G_L$, which determines the loop bandwidth. Control loop integrator 88 integrates the output of amplifier 84 over time. The integration carried out by integrator 88 begins with a certain initial value, which is referred to as a DC offset correction value. The use of this initial value will be described below. The output of integrator 88 is added to the baseband signal, so as to cancel the DC offset.

When designing the DC offset cancellation loop, there typically exists a performance trade-off regarding the choice of loop bandwidth. A narrowband loop causes little or no distortion of the baseband signal, but on the other hand is slow in responding to large variations in DC offset. A wideband loop is faster in responding to DC offset variations, but causes more signal distortion.

The DC offset, however, sometimes exhibits large variations over a short time. For example, in some embodiments AGC unit 72 adjusts the gain of receiver 24 over a wide range, often over 70 dB. The DC offset produced in receiver 24 may vary considerably as a function of receiver gain. Thus, when the AGC unit modifies the receiver gain, the DC offset cancellation loop may have to converge in the presence of large DC offset variations. Moreover, when each gain zone is implemented using a different constellation of amplification stages in LNA 40 and/or baseband amplifier 48, the DC offset may exhibit a different value and a different behavior over time (e.g., due to temperature variations) in different gain zones.

Thus, in some embodiments, baseband circuitry 28 carries out high-performance DC offset cancellation by using multiple DC offset correction values for the multiple gain zones. In the embodiment of FIG. 1, baseband circuitry 28 comprises a DC offset correction memory 92, which holds N registers 96. Each register 96 holds a DC offset correction value that corresponds to a respective gain zone. When the overall input dynamic range is divided into eight gain zones, for example, memory 92 holds eight DC offset correction values in eight registers 96. Each DC offset correction value corresponds to a respective gain zone.

In an embodiment, the DC offset correction value of a given gain zone represents the most up-to-date value that was used by unit 64 to correct the DC offset in this gain zone. During signal reception in terminal 20, AGC unit 72 controls LNA 40 and amplifier 48 so as to set their gain values to match changes in received signal strength. AGC unit 72 also drives unit 76 to select a corresponding gain zone, so as to switch to the respective DC offset correction value.

Typically, baseband circuitry 28 switches from one DC offset correction value to another according to the currently-used gain zone. In the embodiment of FIG. 1, baseband circuitry 28 comprises switches 100 and 104, which select the appropriate register 96 at any given time. Switches 100 and 104 are controlled by gain zone selection unit 76, such that the $i^{th}$ DC offset correction value is selected when receiver 24 is set to use the $i^{th}$ gain zone.

When the change in the gain of receiver 24 causes unit 76 to transition from one gain zone to another, baseband circuitry 28 replaces (using switches 100 and 104) the DC offset correction value from the value of the old gain zone to the value of the new gain zone. Integrator 88 in unit 64 thus initiates DC offset cancellation in the new gain zone with the most up-to-date DC offset correction value that was previously used in this zone. The initial DC offset correction value is typically able to cancel the majority of the DC offset, immediately upon entering the new gain zone.

As long as receiver 24 continues to operate in the same gain zone, the DC offset cancellation loop in unit 64 continues to cancel the DC offset while updating the DC offset correction value. This adaptation cancels any residual DC offset that was not corrected by the initial DC offset correction value, and handles changes in DC offset that occur during operation in the current gain zone. When baseband circuitry 28 decides to switch to a different gain zone, register 96 of the old gain zone retains the most up-to-date DC offset correction value for the old zone, to be used in the next visit to this gain zone. (The term "visiting a gain zone" means switching receiver 24 to a gain setting that corresponds to this gain zone.)

By using the above-described mechanism, unit 64 effectively operates N separate and independent DC offset cancellation loops. Each loop operates when the receiver is switched to the corresponding gain zone, and each loop has a separate respective DC offset correction value that is updated independently of the other DC offset correction values.

Since each DC offset correction value is used within a gain zone in which the DC offset exhibits small changes over time, unit 64 is able to apply a narrow loop bandwidth (small loop gain $G_L$ in loop amplifier 84), without compromising DC offset cancellation accuracy. By using a narrow loop bandwidth, little or no distortion is caused to the baseband signal.

As noted above, in some embodiments LNA 40 and baseband amplifier 48 comprise multiple amplification stages, and each gain setting is implemented by switching a certain constellation or combination of the amplification stages. Each constellation of amplification stages may have different DC offset value and behavior over time (e.g. due to temperature variations) and may be represented by respective gain zone. Performing DC offset cancellation separately in each gain zone is highly effective in reducing transients in the DC offset, which may occur when switching from one gain zone (one constellation of amplification stages) to another.

In some embodiments, baseband circuitry 28 occasionally sets amplifier 84 to apply a large loop bandwidth (large loop gain $G_L$) for short periods of time. For example, when a certain gain zone is about to be visited for the first time, or when a certain gain zone was not visited for a long time, the DC offset correction value of that zone may have become invalid. In such a case, operating the DC offset cancellation loop with a narrow loop bandwidth may not achieve sufficient DC offset cancellation.

In some embodiments, upon switching from one gain zone to another, baseband circuitry 28 checks whether the new gain zone was not visited for more than a predefined time threshold, or is about to be visited for the first time. In another example, baseband circuitry 28 checks whether the difference in temperature relative to the previous visit the gain zone exceeds a certain temperature threshold. If any of these conditions is met, baseband circuitry 28 initially sets amplifier 84 to apply a high loop gain (large loop bandwidth) for a limited time interval, and only then reverts back to the nominal narrow loop gain (narrow loop bandwidth). This technique enables rapid convergence of the DC cancellation loop, i.e., rapid cancellation of the DC offset. In some embodiments, some signal degradation may be caused during the high loop gain period, but this degradation is transient and can usually be tolerated.

In an example embodiment, the narrow bandwidth is on the order of several hundred Hertz (e.g., ~500 Hz) and the wide bandwidth is on the order of a hundred Kilo-Hertz (~100 kHz). In an embodiment, a DC correction value, saved for an un-visited zone, is considered out-of-date after several seconds (e.g., five seconds). The time threshold used for setting the wide bandwidth should typically match this time period. The time until returning back to the normal (narrow) bandwidth typically depends on the convergence time of the wide-bandwidth loop (e.g., ~50 μS).

In some embodiments, baseband circuitry 28 tracks the most recent time each gain zone was visited by storing a respective time stamp for each DC offset correction value. The time stamps can be stored, for example, in memory 92. Alternatively, the baseband circuitry may use any other suitable method for determining the most recent time each gain zone was visited. In some embodiments, baseband circuitry 28 may use any other suitable criteria (e.g. temperature variation) for applying the high loop gain when selecting the gain zone that was visited previously.

The receiver and baseband circuitry configurations of FIG. 1 are example configurations, which are depicted solely for the sake of clarity. In alternative embodiments, any other suitable receiver and baseband circuitry configurations can also be used. For example, in the embodiment of FIG. 1, baseband circuitry 28 carries out DC offset cancellation separately in each gain zone by initiating a digital integrator with a respective DC offset cancellation value for each gain zone. In alternative embodiments, the baseband circuitry may use any other suitable scheme for using different DC offset cancellation values in different gain zones.

In an example embodiment (not explicitly shown in the figure), receiver 24 comprises an analog High-Pass Filter (HPF) for canceling the DC offset. Typically, such a HPF is applied after the received signal is down-converted to baseband and before analog-to-digital conversion of the signal (i.e., after RFFE 32 and before ADC 56). In an embodiment, the HPF comprises multiple selectable capacitors, each capacitor corresponding to a respective gain zone. Each capacitor holds an electrical charge level that corresponds to the DC offset correction value of the respective gain zone. When a certain gain zone is selected, the baseband circuitry selects the HPF capacitor that corresponds to the selected gain zone. As a result, the HPF applies the most up-to-date DC offset correction value that was previously used in this gain zone.

In some embodiments, some or all of the elements of receiver 24 and baseband circuitry 28 are implemented in hardware, such as using one or more Radio Frequency Integrated Circuits (RFICs), Field-Programmable Gate Arrays (FPGAs) or Application-Specific Integrated Circuits (ASICs). Alternatively, some elements of baseband circuitry 28 are implemented in a programmable processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Figure 2:
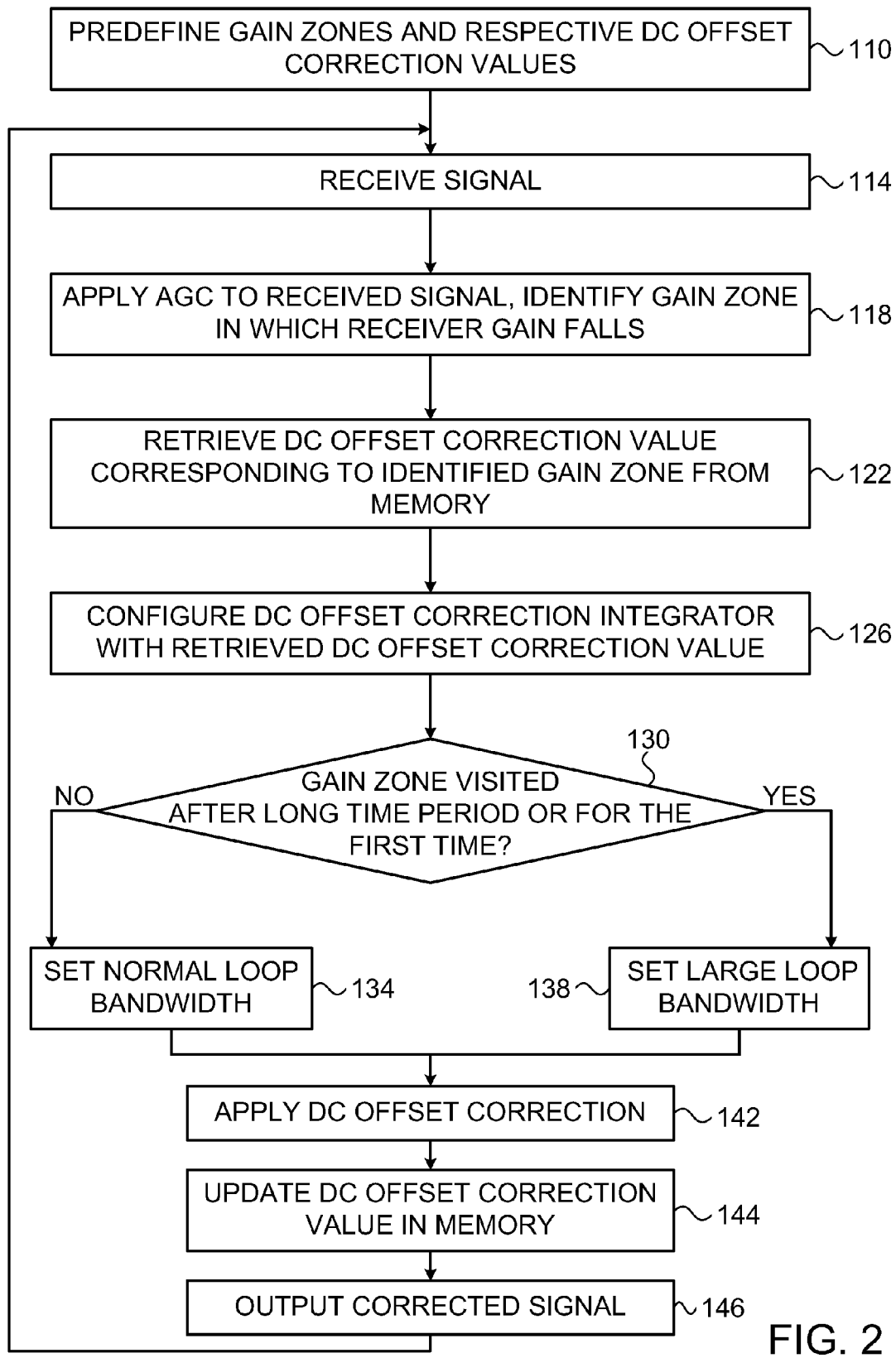
FIG. 2 is a flow chart that schematically illustrates a method for DC offset correction, in accordance with an embodiment that is described herein.

FIG. 2 is a flow chart that schematically illustrates a method for DC offset correction, in accordance with an embodiment that is described herein. The method begins by predefining a set of gain zones and corresponding DC offset correction values, at a predefinition operation 110. The predefined initial DC offset correction values are typically stored in registers 96 of memory 92.

During operation of terminal 20, direct-conversion receiver 24 receives a RF signal, at a reception operation 114. Baseband circuitry 28 applies AGC to the received signal, i.e., switches receiver 24 to a certain gain zone, at a gain control operation 118. The baseband circuitry retrieves from memory 92 the DC offset correction value that corresponds to the selected gain zone, at a correction retrieval operation 122. The baseband circuitry initializes integrator 88 in unit 64 with the retrieved DC offset correction value, at an integrator initialization operation 126.

In some embodiments, when switching to a new gain zone, baseband circuitry 28 checks whether the DC offset correction value for this gain zone is valid or not, at a correction validity checking operation 126. Typically, the baseband circuitry checks whether the new gain zone is about to be visited for the first time (e.g., since initialization), or was not visited for more than a predefined time threshold. If the gain zone was visited recently enough, the baseband circuitry sets loop amplifier 84 to apply a normal loop gain (and thus normal loop bandwidth), at a normal loop bandwidth setting operation 134. If, on the other hand, the gain zone is visited for the first time or after a long time period, the baseband circuitry sets loop amplifier 84 to apply a high loop gain (and thus high loop bandwidth), at a high loop bandwidth setting operation 138.

DC offset cancellation unit 64 then carries out DC offset cancellation in the given gain zone using the applicable DC offset correction value and loop gain, at a cancellation operation 142. Unit 64 updates the DC offset correction value in memory 92, at a correction updating operation 144. Baseband circuitry 28 outputs the corrected signal, at an output operation 146.

Although the embodiments described herein mainly address DC offset cancellation in direct-conversion receivers, the methods and systems described herein can also be used in other applications, such as in receivers having multiple frequency conversions.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method, comprising:
   receiving a signal using a direct conversion receiver, while the receiver is set at a gain that is selected from a range of possible gain values;
   providing multiple DC offset correction values for use by a DC offset cancellation loop, each DC offset correction value being associated with a respective sub-range of the range of the possible gain values;

selecting a DC offset correction value from among the multiple DC offset correction values based on the gain to which the receiver is set;

canceling a DC offset in the signal by setting the DC offset cancellation loop to the selected DC offset correction value; and upon detecting that the gain of the receiver has changed from a first sub-range to a second sub-range of the range of the possible gain values, evaluating a condition with regard to past operation in the second sub-range, and, when the condition is met, initiating cancellation of the DC offset in the second sub-range with an initial loop bandwidth that is larger than a nominal loop bandwidth of the DC offset cancellation loop.

2. The method according to claim 1, wherein selecting the DC offset correction value comprises identifying the sub-range in which the gain of the receiver falls, and choosing the DC offset correction value that is associated with the identified sub-range.

3. The method according to claim 2, wherein canceling the DC offset comprises updating the DC offset correction value while operating in the identified sub-range.

4. The method according to claim 3, wherein selecting the DC offset correction value comprises retrieving the selected DC offset correction value from a memory, and wherein updating the DC offset correction value comprises storing the updated DC offset correction value in the memory.

5. The method according to claim 2, comprising initiating cancellation of the DC offset in the identified sub-range using the selected DC offset correction value.

6. The method according to claim 1, wherein evaluating the condition comprises identifying that the gain of the receiver falls in the second sub-range for a first time.

7. The method according to claim 1, wherein evaluating the condition comprises identifying that a time that elapsed since the gain of the receiver previously fell in the second sub-range exceeds a predefined time threshold.

8. The method according to claim 1, wherein evaluating the condition comprises identifying that a temperature change relative to a previous operation in the second sub-range exceeds a predefined temperature threshold.

9. The method according to claim 1, wherein providing the multiple DC offset correction values comprises defining each of the DC offset correction values for a respective single setting of the gain.

10. The method according to claim 1, wherein canceling the DC offset comprises initializing a DC offset cancellation loop with the selected DC offset correction value, and correcting the DC offset using the initialized DC offset cancellation loop.

11. The method according to claim 1, wherein canceling the DC offset comprises setting a capacitor in a High-Pass Filter (HPF) with an electrical charge corresponding to the selected DC offset correction value, and filtering the signal with the HPF.

12. The method according to claim 11, wherein the HPF comprises multiple selectable capacitors holding electrical charge levels corresponding to the multiple DC offset correction values, and wherein canceling the DC offset comprises selecting the capacitor corresponding to the selected DC offset correction value.

13. An apparatus, comprising:

a direct conversion receiver configured to receive a signal while operating at a gain that is selected from a range of possible gain values; and baseband circuitry comprising DC offset cancellation circuitry, wherein the DC offset cancellation circuitry is configured to hold multiple DC offset correction values that are each associated with a respective sub-range of the range of the possible gain values, select a DC offset correction value from among the multiple DC offset correction values based on the gain to which the receiver is set, cancel a DC offset in the signal using the selected DC offset correction value, and, upon detecting that the gain of the receiver has changed from a first sub-range to a second sub-range of the range of the possible gain values, evaluate a condition with regard to past operation in the second sub-range, and, when the condition is met, initiate cancellation of the DC offset in the second sub-range with an initial loop bandwidth that is larger than a nominal loop bandwidth of the DC offset cancellation loop.

14. The apparatus according to claim 13, wherein the baseband circuitry is configured to identify the sub-range in which the gain of the receiver falls, and to select the DC offset correction value that is associated with the identified sub-range.

15. The apparatus according to claim 14, wherein the baseband circuitry is configured to update the DC offset correction value of the identified sub-range while operating in the identified sub-range.

16. The apparatus according to claim 15,
comprising a memory, wherein the baseband circuitry is configured to retrieve the selected DC offset correction value from the memory, and to store the updated DC offset correction value in the memory.

17. The apparatus according to claim 14, wherein the baseband circuitry is configured to initiate cancellation of the DC offset in the identified sub-range using the selected DC offset correction value.

18. The apparatus according to claim 14, wherein the DC offset cancellation circuitry is configured to evaluate the condition by identifying that the gain of the receiver falls in the second sub-range for a first time, or that a time that elapsed since the gain of the receiver previously fell in the second sub-range exceeds a predefined time threshold, or that a temperature change relative to a previous operation in the second sub-range exceeds a predefined temperature threshold.

19. A mobile communication terminal comprising the apparatus of claim 13.

20. A chipset for processing signals in a mobile communication terminal, the chipset comprising the apparatus of claim 13.

* * * * *